US006836452B2

(12) United States Patent
Matsuda

(10) Patent No.: US 6,836,452 B2
(45) Date of Patent: Dec. 28, 2004

(54) OPTICAL PICKUP APPARATUS

(75) Inventor: Takehiro Matsuda, Saitama (JP)

(73) Assignee: Pioneer Corporation, Tokyo (JP)

(*) Notice: Subject to any disclaimer, the term of this patent is extended or adjusted under 35 U.S.C. 154(b) by 531 days.

(21) Appl. No.: 09/897,605

(22) Filed: Jul. 3, 2001

(65) Prior Publication Data
US 2002/0006087 A1 Jan. 17, 2002

(30) Foreign Application Priority Data
Jul. 4, 2000 (JP) .................................... P. 2000-202263

(51) Int. Cl.[7] .............................................. G11B 7/00
(52) U.S. Cl. .................................. 369/44.14; 369/44.29
(58) Field of Search ...................... 369/44.11, 44.14, 369/44.15, 44.16, 44.22, 44.23, 44.25, 44.26, 44.28, 44.41, 53.23, 53.28, 112.14, 112.17, 117, 44.35, 44.37, 44.27, 116, 121

(56) References Cited
FOREIGN PATENT DOCUMENTS
JP            10-255274        9/1998   ............ G11B/7/08

Primary Examiner—Thang V. Tran
Assistant Examiner—Bach Vuong
(74) Attorney, Agent, or Firm—Sughrue Mion, PLLC

(57) ABSTRACT

There is an optical pickup apparatus 200 using a semiconductor laser element 50 having a first light emission part 36 and a second light emission part 40, wherein it is constructed so that in case that the first light emission part 36 is placed in a position in which an image height does not occur and the second light emission part 40 is placed in a position in which an image height occurs, when the first light emission part 36 is driven, the same focus driving currents are supplied from a focus driving part 120 and when the second light emission part 40 is driven, an objective lens 54b is driven in a focus direction with the objective lens inclined by generating an offset value having a predetermined value from an offset generation part 126 and varying one of the focus driving currents of the focus driving part 120.

7 Claims, 12 Drawing Sheets

IMAGE HEIGHT
(DISTANCE FROM OPTICAL DISK)

OPTICAL PICKUP APPARATUS

BACKGROUND OF THE INVENTION

1. Field of the Invention

The present invention relates to an optical pickup apparatus enabling to read two or more kinds of recording mediums having different reading wavelengths from each other such as a compatible optical pickup apparatus for DVD/CD, and particularly to an optical pickup apparatus using a semiconductor laser element formed of a one-chip laser diode for emitting two laser beams having different wavelengths from each other.

2. Description of the Related Art

Conventionally, a DVD/CD compatible reproducing apparatus sharing an optical pickup of a DVD reproducing apparatus with a CD reproducing apparatus has actively been proposed, and there are forms such as a DVD/CD compatible reproducing apparatus using an optical pickup of one-wavelength/bifocal type and a DVD/CD compatible reproducing apparatus using an optical pickup of two-wavelength/bifocal type.

Comparing a structure of a CD with that of a DVD, a thickness of a protective layer of the DVD (0.6 mm) is about one-half that of a protective layer of the CD. In case of reproducing both of optical disks using an optical pickup of unifocal type, when a light beam is gathered to achieve optimization to an information recording surface of the DVD, the protective layer of the CD through which the light beam passes is thicker than that of the DVD. Therefore, aberration such as spherical aberration occurs in the light beam and thus the light beam cannot be gathered optimally to an information recording surface of the CD. Also, since the CD is different from the DVD in a size of information pits formed for recording, it is necessary to form a beam spot having an optimum size to each of information pits on the information recording surface of the CD or the DVD in order to exactly read each of information pits.

A size of the beam spot is proportional to a ratio of a wavelength of the light beam to a numerical aperture of an objective lens for gathering the light beam on the information recording surface. That is, when it is assumed that a wavelength of the light beam is constant, the beam spot becomes smaller as the numerical aperture becomes larger. Thus, in case of reproducing the CD and the DVD by the optical pickup of unifocal type, when it is constructed so that a wavelength of the light beam is constant and the numerical aperture is adapted for, for example, the information pits of the DVD, the beam spot is too small with respect to the information pits of the CD and distortion occurs in a reproduction signal on reproducing the CD and an exact reading becomes difficult. Hence, a DVD/CD compatible reproducing apparatus using an optical pickup of bifocal type enabling to focalize on different positions on the same straight line and applying two laser beams for forming a beam spot with a proper size in correspondence with a size of each of information pits has become the mainstream.

For example, an optical pickup apparatus shown in FIG. 16 is a DVD/CD compatible reproducing apparatus mixing an optical path from a first light source 10 for CD and an optical path from a second light source 15 for DVD are mixed by a first beam splitter 13 acting as a prism to apply the mixed optical path to a bifocal lens comprising an objective lens and a diffraction element. A configuration and operation thereof will be described briefly.

In FIG. 16, according to a driving signal from a first driving circuit 11, the first light source 10 generates a laser beam (shown by a broken line) having a wavelength (780 nm) most suitable for an information reading from a CD, and this laser beam is applied to the first beam splitter 13 through a grating 12 for generating three beams. The first beam splitter 13 reflects the laser beam from the first light source 10 to guide the reflected light to a second beam splitter 14.

On the other hand, according to a driving signal from a second driving circuit 16, the second light source 15 placed at a 90° angle with respect to the first light source 10 generates a laser beam (shown by a solid line) having a wavelength (650 nm) most suitable for an information reading from a DVD, and this laser beam is applied to the first beam splitter 13 through a grating 17 for generating three beams. The first beam splitter 13 transmits the laser beam from the second light source 15 to guide the laser beam to the second beam splitter 14.

The second beam splitter 14 guides the laser beam supplied through the first beam splitter 13, namely the laser beam from the first light source 10 or the second light source 15 to a bifocal lens 19 through a collimator lens 18. The bifocal lens 19 applies a information reading light gathered the laser beam from the second beam splitter 14 at one point to an information recording surface of an optical disk 21 rotated and driven by a spindle motor 20.

The laser beam from the first light source 10 (shown by a broken line) is gathered by the bifocal lens 19 to focus on an information recording surface C of the optical disk 21. Also, the laser beam from the second light source 15 (shown by a solid line) is gathered by the bifocal lens 19 to focus on an information recording surface D of the optical disk 21.

The reflected light, which is caused by applying the information reading light from the bifocal lens 19 to the optical disk 21, passes through the bifocal lens 19 and the collimator lens 18, is reflected by the second beam splitter 14, passes through a cylindrical lens 22 which is an astigmatism generation element, and is applied to a photodetector 23. The photodetector 23 generates an analog electrical signal having a level corresponding to the quantity of an applied light to supply the signal to an information data reproducing circuit 24 and a disk determination circuit 25 as a reading signal.

The information data reproducing circuit 24 generates a digital signal based on the obtained reading signal and further performs demodulation and error correction to the digital signal and reproduces an information data. The disk determination circuit 25 identifies a kind of the optical disk 21 based on a size of a beam spot formed at the time of applying a laser beam to the optical disk 21 to supply a disk identification signal to a controller 26 as disclosed in, for example, JP-A-10-255274 by the present applicant. According to the disk identification signal, the controller 26 drives and controls any one of the first driving circuit 11 and the second driving circuit 16 in order to selectively bring about a drive state.

The controller 26 drives only the first driving circuit 11 when the disk identification signal indicating the CD is obtained from the disk determination circuit 25. Accordingly, a laser beam emitted from the first light source 10 is applied to the optical disk 21 through an optical system comprising the grating 12, the first beam splitter 13, the second beam splitter 14, the collimator lens 18 and the bifocal lens 19. Then, the reflected light (return light) reflected by the information recording surface C of the optical disk 21 passes through the bifocal lens 19 and the collimator lens 18, is reflected by the second beam splitter 14, passes through the cylindrical lens 22, and is applied to the photodetector 23.

The controller 26 drives only the second driving circuit 16 when the disk identification signal indicating the DVD is obtained from the disk determination circuit 25. Accordingly, a laser beam emitted from the second light source 15 is applied to the optical disk 21 through an optical system comprising the grating 17, the first beam splitter 13, the second beam splitter 14, the collimator lens 18 and the bifocal lens 19. Then, the reflected light (return light) reflected by the information recording surface D of the optical disk 21 passes through the bifocal lens 19 and the collimator lens 18, is reflected by the second beam splitter 14, passes through the cylindrical lens 22, and is applied to the photodetector 23.

That is, the CD/DVD compatible reproducing apparatus comprises the first light source 10 for emitting the laser beam having the wavelength most suitable for the information reading from the optical disk 21 having a relatively low recording density such as the CD and the second light source 15 for emitting the laser beam having the wavelength most suitable for the information reading from the optical disk 21 having a high recording density such as the DVD to alternatively select the light source corresponding to the kind of the optical disk 21 targeted for reproduction.

As described above, while the DVD/CD compatible reproducing apparatus requiring two light sources requires the first beam splitter 13 serving as the prism and increases a cost compared with an optical pickup apparatus having one light source. When the first light source 10 is applied from one side of the first beam splitter 13, it is necessary to apply the second light source 15 from another side perpendicular to the first light source 10 and thus, there was a problem that space for placing the optical system increases and a size of the optical pickup apparatus becomes large.

SUMMARY OF THE INVENTION

The invention is implemented in view of the above-described problem, and an object of the invention is to provide an optical pickup apparatus in correspondence with two wavelengths enabling to miniaturize without using the prism.

In order to solve the problem, an optical pickup apparatus according to a first aspect of the invention, the optical pickup apparatus enabling to read information of a plurality of recording mediums having different reading wavelengths from each other, the optical pickup apparatus comprises:

a light emission unit including a first light emission source adapted to emit a first laser beam, and a second light emission source disposed adjacent to the first light emission source and adapted to emit a second laser beam whose wavelength is different from that of the first laser beam;

an objective lens fixed to a movable member, the objective lens for focusing the first and second laser beam;

a focus driving unit for driving the objective lens in at least one direction;

a photodetection unit; and an optical system for guiding the first and second laser beams emitted from the light emission unit to the recording medium, the optical system for guiding a reflected light beam reflected by the recording medium to the photodetection unit, wherein the focus driving unit comprises a plurality of focus driving units;

the focus driving units are symmetrically placed with respect to the static balancing point of a support part for supporting the movable member;

each of the focus driving units has at least one pair of driving coils to which focus driving currents are supplied to generate a driving force in a focus direction;

the focus driving currents different from each other are supplied to the force driving units, respectively, to drive the objective lens in the focus direction with an inclination in relation to the focus direction.

In a second aspect of the invention, there is provided the optical pickup apparatus according to the first aspect of the invention, wherein any one of the first and second light emission sources is selectively driven to emit a laser beam.

In a third aspect of the invention, there is provided the optical pickup apparatus according to the first aspect of the invention, wherein the focus direction, in which the objective lens is driven, is a direction for focusing the first and second light beams at a predetermined position on the recording medium.

In a fourth aspect of the invention, there is provided the optical pickup apparatus according the first aspect of the invention, wherein the optical system including:

a grating for generating a pair of sub-beams from the first and second laser beams;

a half mirror for guiding the first and second laser beams to the recording medium while guiding a reflected light beam reflected by the record medium to the photodetection unit;

a collimator lens for converting the first and second laser beams into a parallel light beam; and a cylindrical lens.

In a fifth aspect of the invention, there is provided the optical pickup apparatus according the first aspect of the invention, wherein one of the first and second light emission sources is placed in a position which has an image height with respect to the objective lens;

the other of the first and second light emission sources is placed in a position which has not the image height;

when one of the first and second light emission sources is driven, the focus driving currents different from each other are supplied to the pair of the focus driving coils, respectively, when the other of the first and second light emission sources is driven, the focus driving currents, which are equal to each other, are supplied to the pair of the focus driving coils, respectively.

In a sixth aspect of the invention, there is provided the optical pickup apparatus according the first aspect of the invention, further comprising an offset addition unit for adding an offset current to the focus driving current, wherein when one of the first and second light emission sources is driven, the focus driving current and the sum of the focus driving current and the offset current added by the offset addition unit are supplied to the pair of the focus driving coils, respectively.

In a seventh aspect of the invention, there is provided the optical pickup apparatus according the first aspect of the invention, wherein the focus driving current is generated based on a focus error signal.

DETAILED DESCRIPTION OF THE PREFERRED EMBODIMENTS

An embodiment of the invention will be described below taking an optical pickup apparatus 200 for reproducing a DVD and a CD or a CDR both having different reading wavelengths from each other as an example. Incidentally, a recording media to be reproduced are not limited to them and the invention can be applied as long as there is an optical pickup apparatus 200 for reproducing a plurality of disks having different reading wavelengths from each other.

Figure 1:
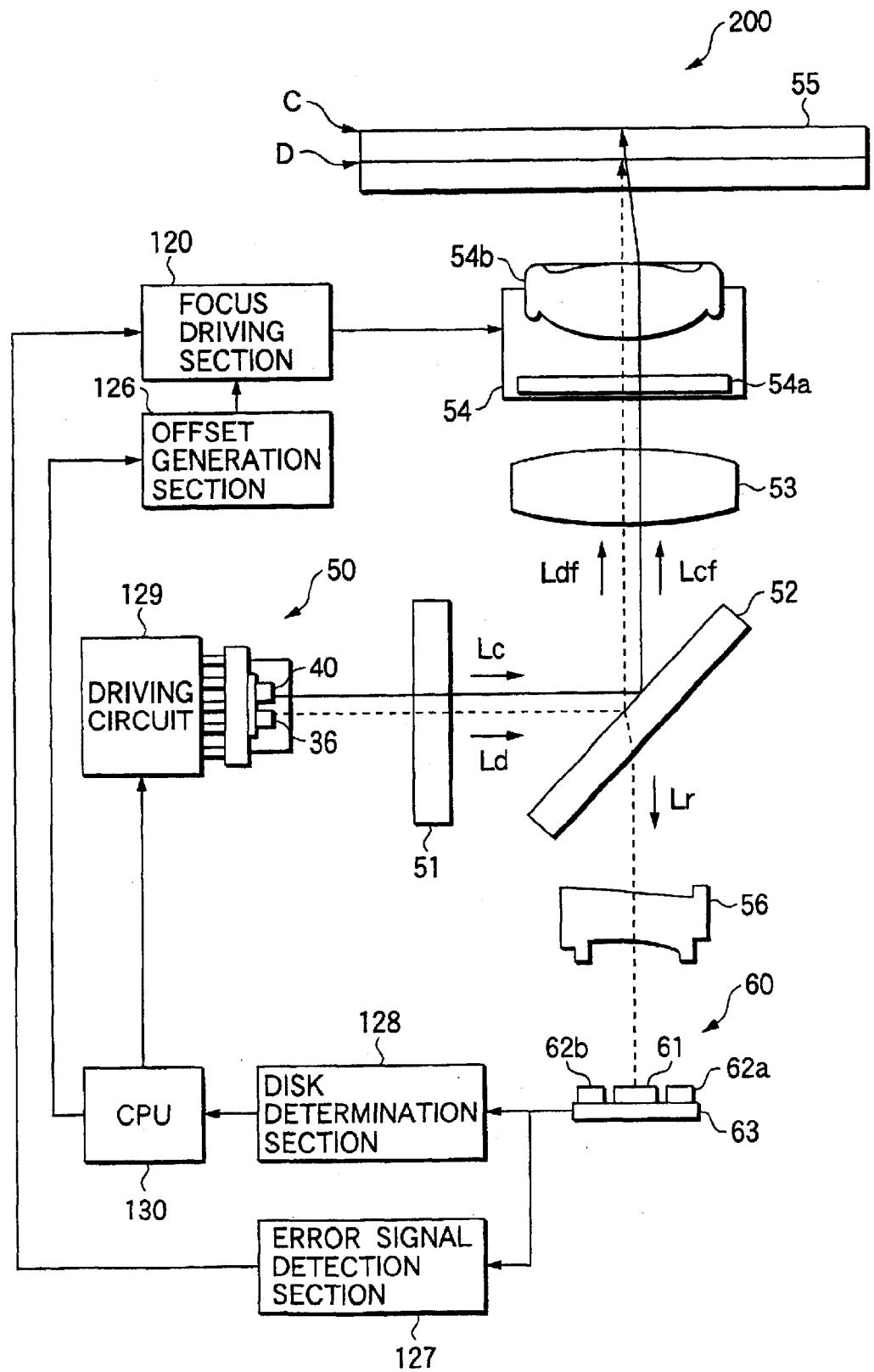
FIG. 1 is a block diagram of an optical pickup apparatus according to an embodiment of the invention.

FIG. 1 is a main configuration diagram of an optical pickup apparatus 200 according to an embodiment of the invention and a configuration of the optical pickup apparatus 200 will be described on the basis of the FIG. 1. The optical pickup apparatus 200 comprises: a semiconductor laser element 50 acting as a light emission unit for emitting two laser beams having different wavelengths from each other; a grating lens 51 for generating a pair of sub-beams for tracking error generation from the emitted laser beams; a half mirror 52 for reflecting the laser beam emitted from the semiconductor laser element 50 to guide the laser beam to an optical disk 55 while transmitting the laser beam reflected from an information recording surface of the optical disk 55 to guide the laser beam toward a photodetector 60; a collimator lens 53 for converting the laser beam into parallel light; a bifocal lens 54 for converging the laser beams having the different wavelengths from each other to focus at different positions on the same straight line to form beam spots having proper sizes; a cylindrical lens 56 which is an astigmatism generation element; and the photodetector 60 which is photodetection unit.

The photodetector 60 generates an electrical signal having a level corresponding to the quantity of the applied light, and supplies the signal to an error signal detection section 127 and a disk determination circuit 128. The error signal detection section 127 supplies the obtained focus error signal to a focus driving section 120 which is a focus driving unit, and also supplies the obtained tracking error signal to a tracking driving section (not shown). The focus driving section 120 controls a focus direction of the bifocal lens 54 based on the focus error signal supplied from the error signal detection section 127. The disk determination circuit 128 identifies a kind of the optical disk 55 based on a size of a beam spot formed at the time of applying a laser beam to the optical disk 55 to generate a disk identification signal and supplies the disk identification signal to a CPU 130, for example, as disclosed in JP-A-10-255274 by the present applicant. According to the disk identification signal, the CPU 130 selectively drives and controls any one of a first light emission part 36 and a second light emission part 40 of the semiconductor laser element 50 through a driving circuit 129.

Also, the CPU 130 controls an offset value of an offset generation section 126 based on the disk identification signal. The offset generation section 126 supplies an offset value of "1" indicating no offset to the focus driving section 120 based on a control signal from the CPU 130 determining that the optical disk 55 is a DVD based on the disk identification signal. Also, the offset generation section 126 supplies a predetermined offset value to the focus driving section 120 based on the control signal from the CPU 130 determining that the optical disk 55 is a CD based on the disk identification signal. Such the offset values are provided in order to adjust an optical axis direction of an objective lens 54b when the bifocal lens 54 is controlled in a focus direction to be set in case that the optical disk 55 is a CD or a CDR. Though a detailed description will be given later, the bifocal lens 54 is driven by a focus driving coil 70 formed of a pair of right and left plane coils. In case of setting the predetermined offset value, it is constructed so as to control the focus direction with an optical axis of the objective lens 54b inclined by supplying an offset focus driving current to one focus coil.

Next, configurations and operations of each circuit block constructing the optical pickup apparatus 200 according to the embodiment of the invention will be described. The photodetector 60 used in the embodiment is constructed to perform a focus servo adjustment by an astigmatism method and to perform a tracking servo adjustment by a three-beam method. A configuration and operation of the photodetector 60 will be described referring to FIGS. 2 to 4. Incidentally, FIG. 2 is a configuration diagram of the photodetector 60, and FIG. 3 is an operational illustration diagram of the three-beam method, and FIG. 4 is an operational illustration diagram of the astigmatism method.

Figure 2:
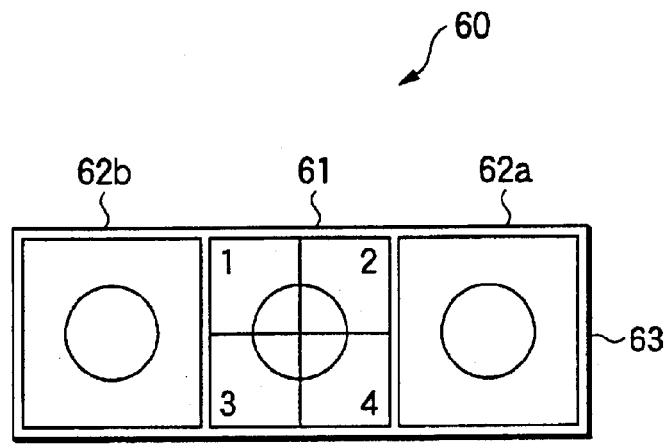
FIG. 2 is a configuration diagram of a photodetector used in the optical pickup apparatus according to the embodiment of the invention.

As shown in FIG. 2, on a substrate 63, the photodetector 60 comprises a first detection part 61 divided into four division areas 1, 2, 3, 4 for receiving a main beam M of the first and second laser beams, and two sub-detection parts 62a, 62b for receiving sub-beams S1, S2 of the first and second laser beams used for generation of a tracking error signal.

Figure 3:
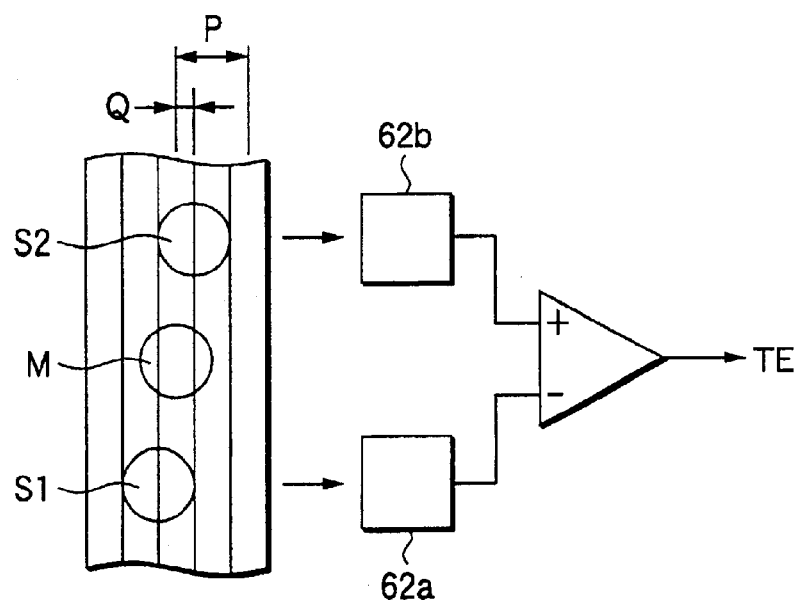
FIG. 3 is a diagram used for illustrating a three-beam method.
Figure 4:
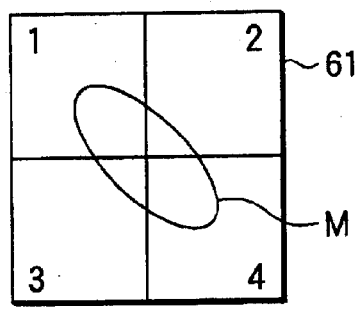
FIG. 4 is a diagram used for illustrating an astigmatism method.
Figure 4:
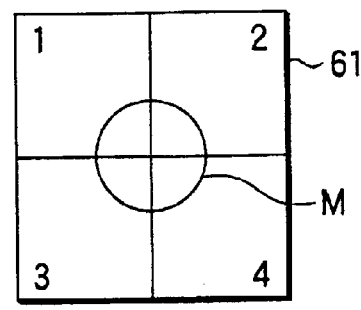
Figure 4:
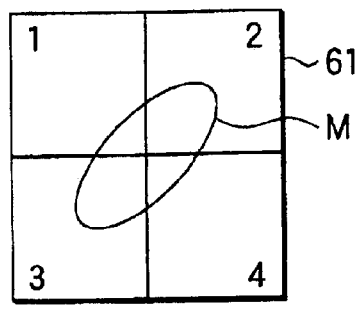

In the three-beam method, as shown in FIG. 3, two sub-beam spots S1, S2 are offset by Q in the reverse direction with respect to a main beam spot M, respectively. The offset amount Q is set to about ¼ of a track pitch P. There is a method in which reflected light by each of the sub-beam spots S1, S2 is detected by the sub-detection parts 62a, 62b, respectively, and a difference between the detected outputs becomes a tracking error TE signal.

Also, in the four division detection part 61 for performing the astigmatism method, as shown in FIG. 4B, when the beam spot is a complete circle shape, areas of the beam spot applied to division areas being on a diagonal line are equal to each other and a component of the focus error FE signal is "0". Also, when focus is not achieved, according to astigmatism characteristics of the cylindrical lens 56, a beam spot having an elliptic shape is formed in a direction of the diagonal lines as shown in FIG. 4A or FIG. 4C. In this case, an area of the beam spot applied to the division areas being on one of diagonal lines is different from that on the other of the diagonal lines and the focus error FE signal, which is not "0", is output. Then, an electric signal is supplied to a demodulation circuit (not shown) and the error signal detection section 127 based on a spot image formed on each of four division areas.

Figure 5:
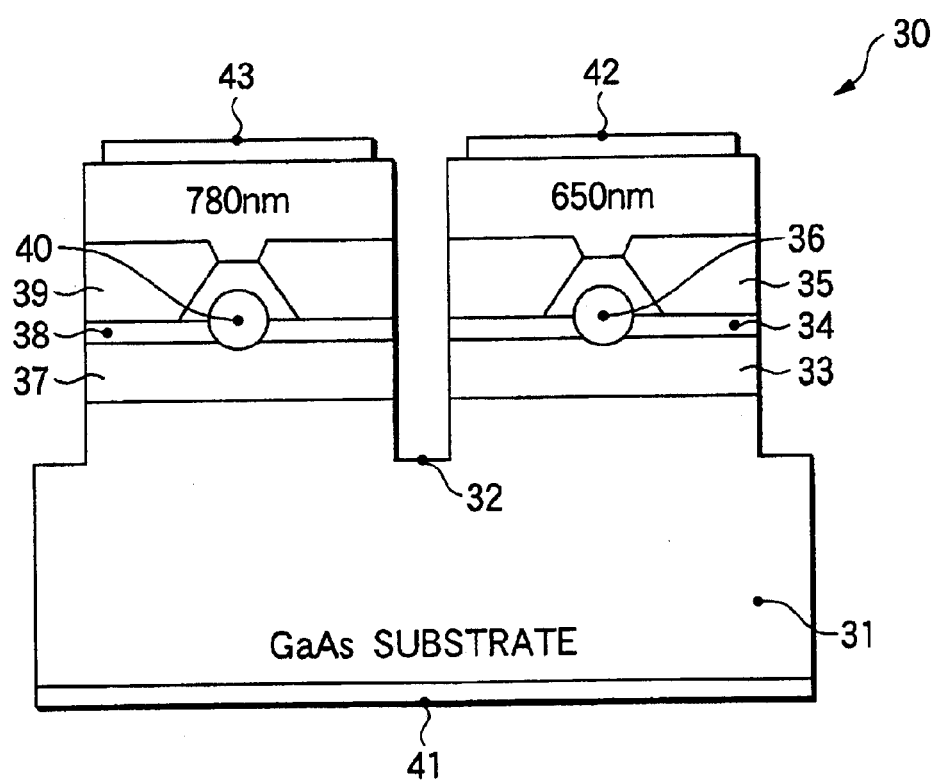
FIG. 5 is a structure view of a semiconductor laser element used in the optical pickup apparatus according to the embodiment of the invention.
Figure 6:
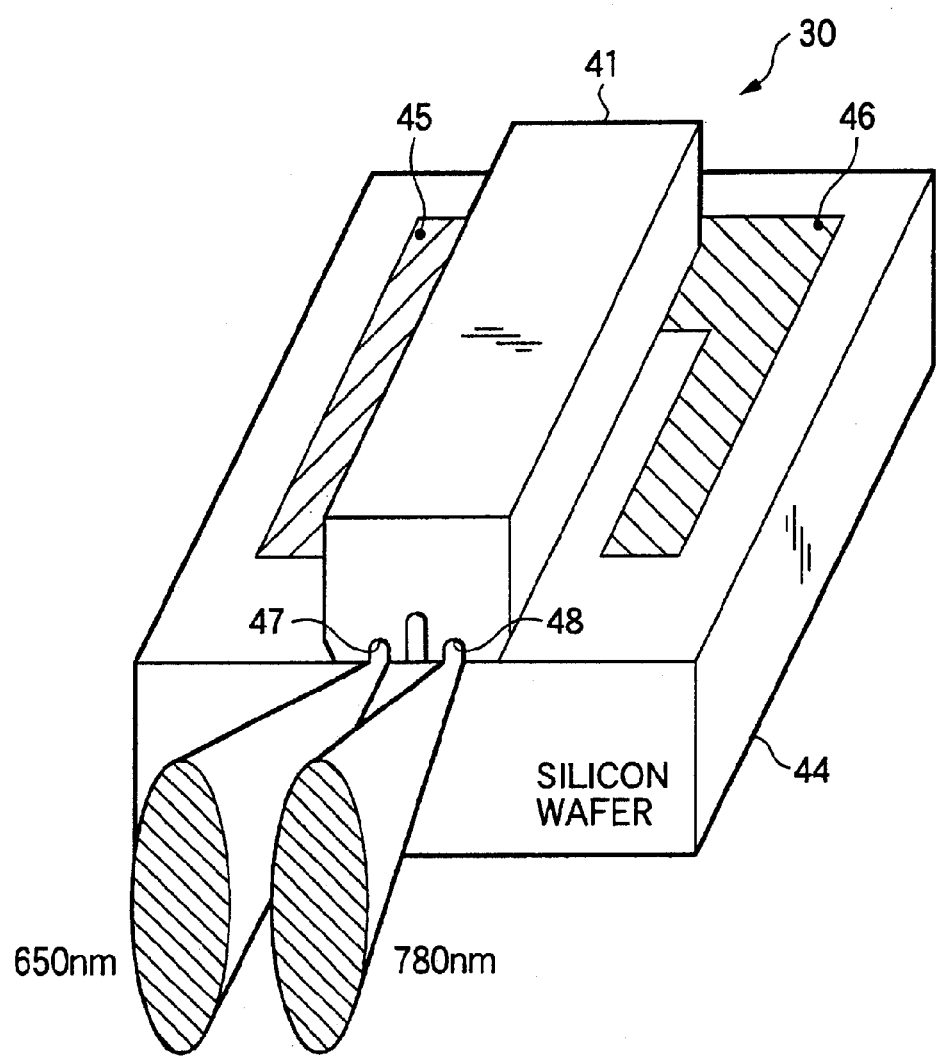
FIG. 6 is a sub-mount structure view of the semiconductor laser element.

Next, a semiconductor laser element 50 constructing the optical pickup apparatus 200 according to the embodiment of the invention will be described. The semiconductor laser element 50 used in the embodiment is a one-chip laser diode 30 for emitting two wavelengths type of a first laser beam having a wavelength of 650 nm for DVD reading and a second laser beam having a wavelength of 780 nm for CD or CDR reading, and a structure of the laser diode is shown in FIGS. 5 and 6. FIG. 5 is a sectional view of the one-chip laser diode 30 and FIG. 6 is a sub-mount view of the one-chip laser diode 30.

As shown in FIG. 5, the one-chip laser diode 30 has a structure in which an n-type $Al_XGa_YIn_{1-X-Y}P$ layer 33, an $Al_XGa_YIn_{1-X-Y}P$ active layer 34, and a p-type $Al_XGa_YIn_{1-X-Y}P$ layer 35 are stacked on a GaAs substrate 31 having an outer size of the order of 300 µm×400 µm×100 to 120 µm and a first light emission part 36 acting as a first light emission source for emitting the first laser beam having the wavelength of 650 nm is formed in the center of the active layer 34 and also an n-type $Al_XGa_{1-X}As$ layer 37, an $Al_XGa_{1-X}As$ active layer 38 and a p-type $Al_XGa_{1-X}As$ layer 39 are stacked and a second light emission part 40 acting as a second light emission source for emitting the second laser beam having the wavelength of 780 nm is formed in the center of the active layer 38 and the two active layers 34, 38 having a thickness of about 4 µm are isolated by an isolated trench 32. Therefore, the first light emission part 36 and the second light emission part 40 have a structure spaced about 100 µm apart by the isolated trench 32.

Also, in the one-chip laser diode 30, a common electrode 41 is formed on the bottom side of the GaAs substrate 31 and an Au electrode 42 for the first light emission part 36 is formed on the top side of the first light emission source and an Au electrode 43 for the second light emission part 40 is formed on the top side of the second light emission source, respectively. That is, the one-chip laser diode 30 is the semiconductor laser element 50 in which one of the electrodes of the first and second light emission sources is formed as the common electrode.

Generally, an element of "one-chip" means an element constructed so that laser beams of two wavelengths can be outputted by fabricating two active layers of different kinds on the one-chip with a selective growth method, but in the invention, an element obtained by forming two laser elements for emitting a laser beam of one wavelength in a hybrid manner, for example, arrangement on a silicon wafer, namely a hybrid type element obtained by integrating two laser elements of one wavelength into a united element is also an target.

Also, as shown in FIG. 6, the one-chip laser diode 30 is used in sub-mount form placed on a silicon wafer 44 on which two Al electrodes 45, 46 are formed. That is, in the sub-mount, the one-chip laser diode 30 having the common electrode 41 directed upward is placed on the silicon wafer 44 on which the Al electrode 45 for the first light emission part 36 and the Al electrode 46 for the second light emission part 40 are formed and the Au electrode 42 for the first light emission part 36 and the Au electrode 43 for the second light emission part 40 are soldered to the two Al electrodes 45, 46, respectively, and lead wires (not shown) is soldered to the common electrode 41 and the two Al electrodes 45, 46 for using.

Then, the first laser beam having the wavelength of 650 nm is emitted from a light emission window 47 when a predetermined voltage is applied between the common electrode 41 and the Al electrode 45, and the second laser beam having the wavelength of 780 nm is emitted from a light emission window 48 when a predetermined voltage is applied between the common electrode 41 and the Al electrode 46. Any beam shapes of the first and second laser beams are elliptic shapes as shown in FIG. 6. Then, the one-chip laser diode 30 having the sub-mount shape is held in, for example, a case for providing a light emission window and a plurality of output terminals (not shown) and is used as the semiconductor laser element 50.

In the semiconductor laser element 50, the first light emission part 36 for emitting the first laser beam having the wavelength of 650 nm and the second light emission part 40 for emitting the second laser beam having the wavelength of 780 nm are formed on the same chip at the distance of about 100 µm as described above. Therefore, as shown in FIG. 1, an optical path (shown by a dotted line in the drawing) of emission light Ld of the first laser beam does not match with an optical path (shown by a broken line in the drawing) of emission light Lc of the second laser beam and the paths deviate somewhat different from each other.

Incidentally, the two optical paths are not formed at the same time since the first laser beam and the second laser beam are selectively driven. However, for convenience in understanding explanation, in the drawings of the specification, emission light Ld, Lc of the first and second laser beams, incident light Ldf, Lcf of the first and second laser beams and return light Lr of the first and second laser beams are described within the same drawing.

Figure 7:
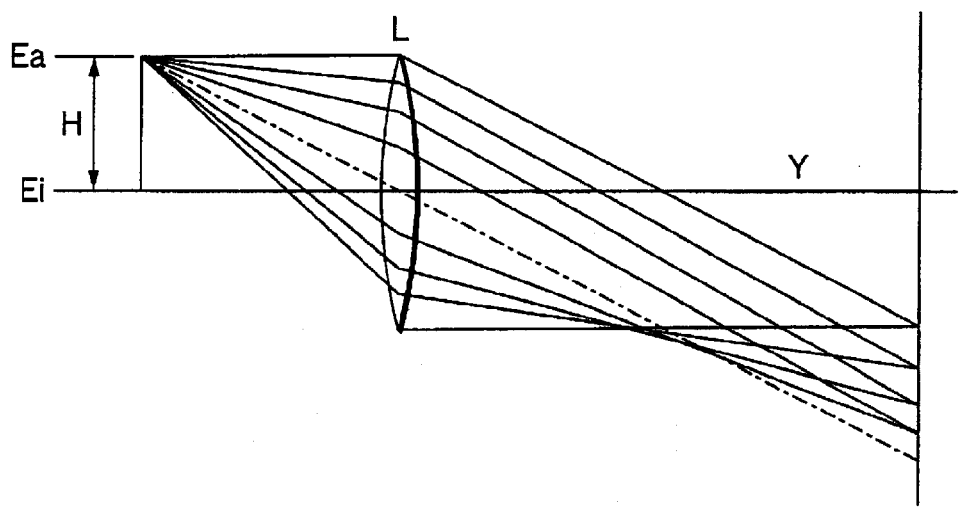
FIG. 7 is a diagram showing a position relation between a light source and a center axis of a lens.

Next, setting of an arrangement relation between the first light emission part 36 and the second light emission part 40 will be described referring to FIGS. 7 and 8. In an optical system constructed of light sources and an objective lens generally, the light sources is used by placing the light sources on the center axis of the objective lens, but in the semiconductor laser element 50 of the embodiment, the first laser beam and the second laser beam are emitted from a position spaced about 100 µm as described above, so that both of the two laser beams cannot be placed on the center axis of the lens at the same time. As shown in FIG. 7, it has been found that a beam spot size is smallest when a light source Ei is placed on a center axis Y of a lens L and the beam spot size increases as the light source Ei is distant from the center axis Y of the lens. This is referred to as a coma aberration and when a center Ea of the light source does not match with the optical axis Y, it becomes a deviation of an image height H and the coma aberration occurs. It is desirable to reduce the coma aberration as much as possible because the coma aberration has a bad influence on a reading signal and it is necessary to optimize a position relation of two light sources to the center axis of the optical system.

Figure 8:
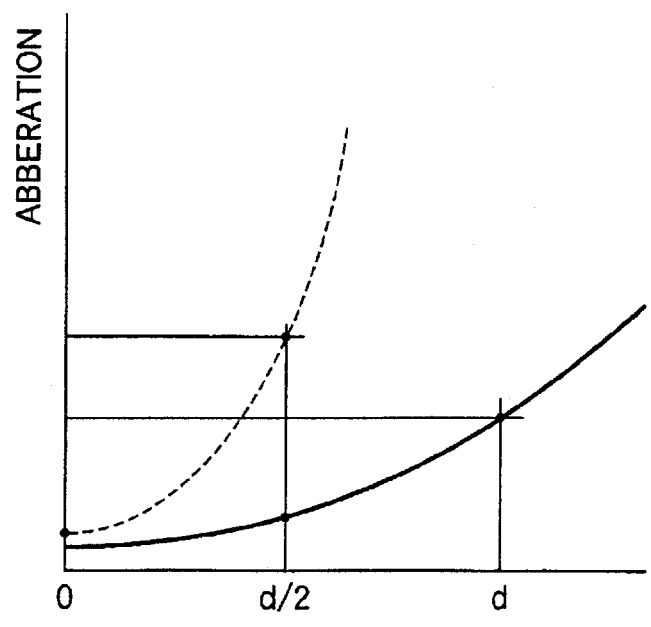
FIG. 8 is a diagram showing a relation between an image height and a coma aberration.

Also, FIG. 8 shows a relation between an image height and an aberration in reproducing a CD or a DVD. A dotted line shows the relation between the image height and the aberration in reproducing a DVD, and a solid line shows the relation between the image height and the aberration in reproducing a CD.

As can be seen from FIG. 8, the aberration in reproducing the DVD is larger compared with the aberration in reproducing the CD regardless of the image height. The proportion (slope of the dotted line) of an increase in the aberration in reproducing the DVD is larger compared with the proportion (slope of the solid line) of an increase in the aberration in reproducing the CD. Also, even when the image height=0, namely the light emission point is placed on the optical axis, the aberration in reproducing the DVD is larger compared with the aberration in reproducing the CD. This is because a numerical aperture of an objective lens is varied corresponding to a wavelength of a laser beam used in reading. That is, in reproducing the DVD, an objective lens having a numerical aperture of 0.6 is used to the laser beam having the wavelength of 650 nm and in reproducing the CD, an objective lens having a numerical aperture of 0.45 is used to the laser beam having the wavelength of 780 nm. Since design for reducing the aberration becomes difficult with an increase in the numerical aperture of the lens, the relation of the aberration shown in FIG. 8 occurs. As a result of that, the case of using the objective lens having a large numerical aperture to the laser beam having a short wavelength such as reproducing the DVD is subject to a bad influence due to a deviation of the image height compared with the case of using the objective lens having a small numerical aperture to the laser beam having a long wavelength such as reproducing the CD.

Hence, in the optical pickup apparatus 200 according to the embodiment, the semiconductor laser element 50 is placed so that the first light emission part 36 for emitting the first laser beam for reproducing the DVD, which is subject to the great influence of the aberration due to the image height deviation, is on a center axis of an optical system to set the best position optically with respect to the first laser beam. Accordingly, the second light emission part 40 for emitting the second laser beam is in a position distant from the center axis of the optical system, so that a bad influence due to the image height deviation occurs with respect to the second laser beam. As a method for solving this, an offset generation section 126 is provided to supply a predetermined offset value to a focus driving section 120, and thereby it is constructed so as to vary one focus driving current of focus driving coils 70 and incline an optical axis of an objective lens 54*b* and electrically correct the image height deviation of the second laser beam.

Figure 9:
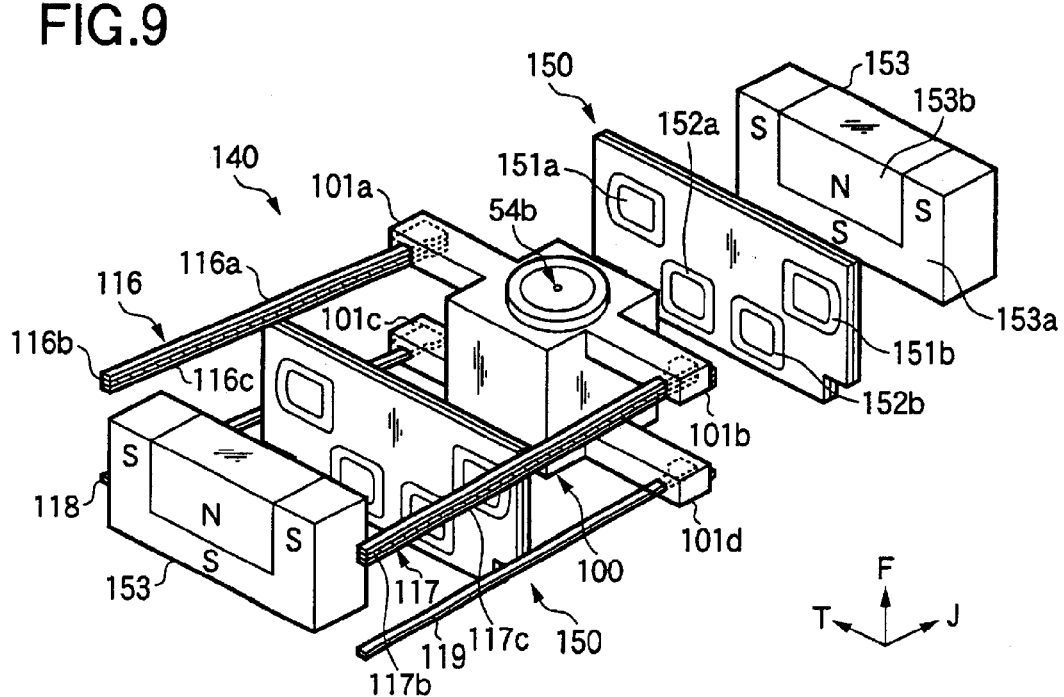
FIG. 9 is an exploded perspective view of an actuator part constructing the optical pickup apparatus according to the embodiment of the invention.
Figure 10:
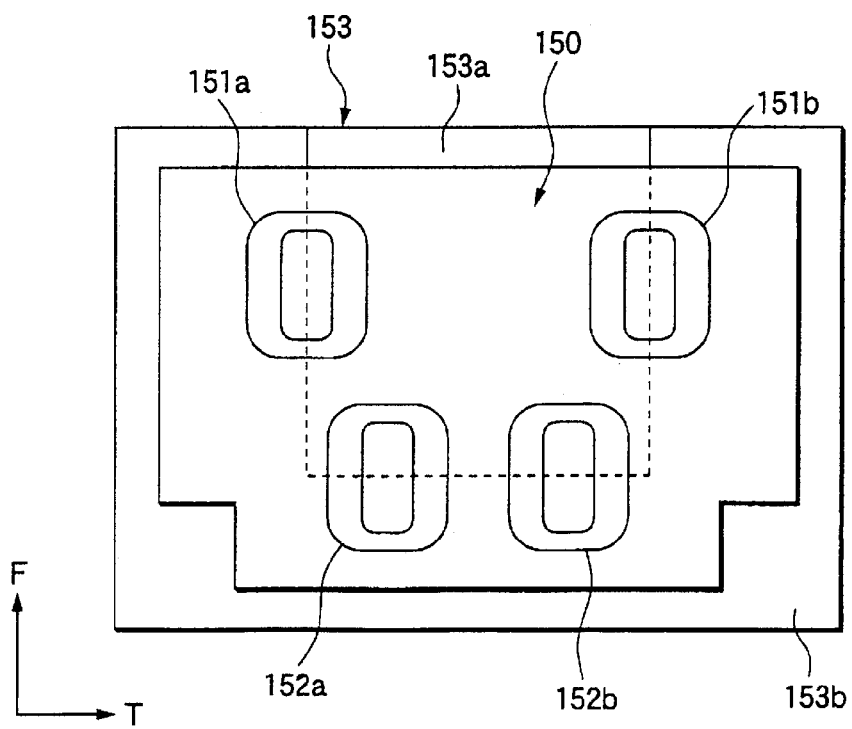
FIG. 10 is a plan view of a printed coil constructing the optical pickup apparatus according to the embodiment of the invention.

Next, a structure of an actuator 140 enabling to correct the image height deviation will be described referring to FIG. 9. FIG. 9 is a main exploded perspective view of the actuator 140 constructing the optical pickup apparatus 200 according to the embodiment, and FIG. 10 is a diagram showing a relative position relation between a printed coil board 150 and a magnet 153. Incidentally, in FIG. 10, F denotes a focus direction and T denotes a tracking direction and J denotes a jitter direction.

In the actuator 140 according to the embodiment, a movable body is formed by fixing an objective lens 54*b* and the pair of printed coil boards 150 in a lens holder 100 and this movable body is supported movably in the focus direction and the tracking direction and inclinably in the focus direction. Specifically, four arm parts 101*a*, 101*b*, 101*c*, 101*d* formed in the lens holder 100 are connected to the side of one ends of four linear suspension members 116, 117, 118, 119 extending in the jitter direction and the side of the other ends of the linear suspension members are connected to an actuator base (not shown) and thereby, the lens holder 100 is supported in a floating state.

Also, the pair of the printed coil boards 150 are fixed in the lens holder 100 in a state of being arranged in the jitter direction, and a pair of tracking coils 151*a*, 151*b* and focus coils 152*a*, 152*b* whose coil surfaces are perpendicular to the jitter direction are formed on each of the printed coil boards 150, respectively. On the other hand, a pair of magnets 153 constructing a magnetic circuit are provided in the actuator base (not shown), and the magnet has a south pole face 153*a* having a substantially U shape and a north pole face whose three directions are surrounded by the south pole face. These magnetic pole faces are perpendicular to the jitter direction, and are faced to the coil faces of the tracking coils 151*a*, 151*b* and the focus coils 152*a*, 152*b* to be parallel.

As shown in FIG. 10, the tracking coils 151*a*, 151*b* are positioned so that the left half and the right half face to different magnetic pole faces, respectively, and thereby, the tracking coils 151*a*, 151*b* are constructed so that magnetic fluxes of the opposite directions in the jitter direction are applied to the left half and the right half, respectively. Also, the focus coils 152*a*, 152*b* are positioned so that the upper half and the lower half face to different magnetic pole faces, respectively, and thereby, the focus coils 152*a*, 152*b* are constructed so that magnetic fluxes of the opposite directions in the jitter direction is applied to the upper half and the lower half, respectively.

The linear suspension member 116 of the four linear suspension members 116 to 119 is formed of a three-layer structure, which is a first metal linear part 116*a*, an insulating material part 116*b* and a second metal linear part 116*c*, and the first metal linear part 116*a* and the second metal linear part 116*c* are electrically insulated by the insulating material part 116*b*. Similarly, the linear suspension member 117 is formed of a three-layer structure, which is a first metal linear part 117*a*, an insulating material part 117*b* and a second metal linear part 117*c*, and the first metal linear part 117*a* and the second metal linear part 117*c* are electrically insulated by the insulating material part 117*b*. In the linear suspension members 118 and 119, the whole thereof is formed of one-layer metal.

These linear suspension members 116 to 119 are also used as a feeder of a driving current to the focus coils 152*a*, 152*b* and the tracking coils 151*a*, 151*b*. In the embodiment, it is constructed so that the pair of the tracking coils 151*a* and 151*b* are connected in series by a connecting line (not shown) and the same tracking driving current is supplied to the pir of the tracking coils 151*a* and 151*b*. However, it is constructed so that different focus driving currents are supplied to the focus coils 152*a*, 152*b*, respectively, because of a reason described later. Then, the first metal linear part 116*a*, the second metal linear part 116*c*, the first metal linear part 117*a*, the second metal linear part 117*c*, the linear suspension member 118 and the linear suspension member 119 are used as six input/output lines.

For example, it can be constructed so that the first metal linear part 116*a* and the second metal linear part 116*c* take charge of an input line and an output line of a driving current to the focus coil 152*a*, and the first metal linear part 117*a* and the second metal linear part 117*c* take charge of an input line and an output line of a driving current to the focus coil 152*b* and the linear suspension member 118 and 119 take charge of an input line and an output line of a driving current to the pair of the tracking coils 151*a*, 151*b*.

Figure 11:
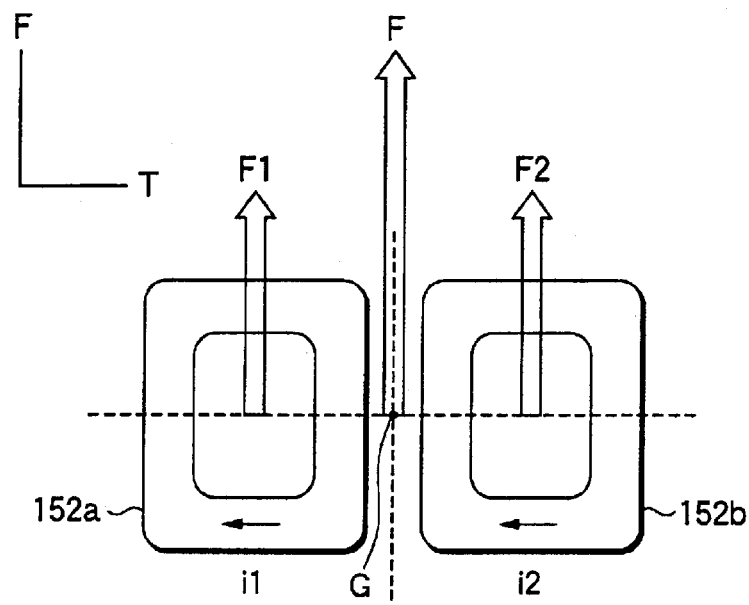
FIG. 11 is an illustration diagram showing a method for compensating an image height deviation of the invention.
Figure 12:
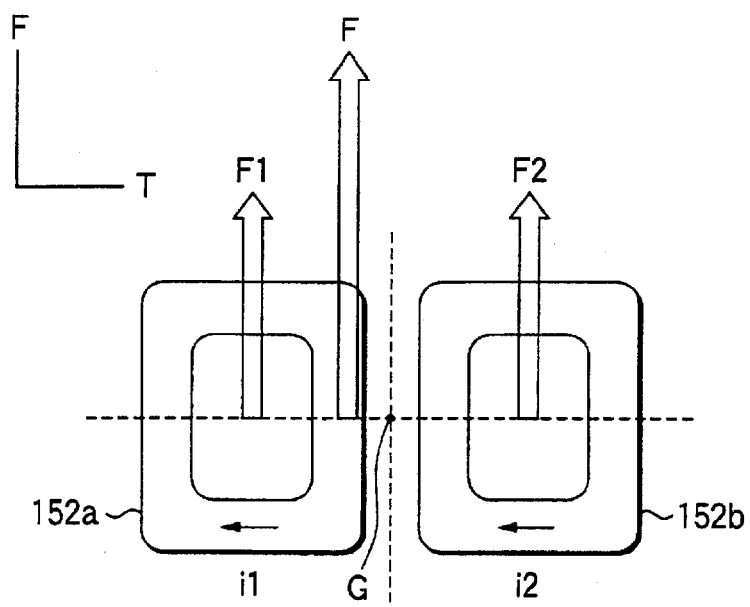
FIG. 12 is an illustration diagram showing a method for compensating an image height deviation of the invention.

Next, a method for compensating the image height deviation in the invention will be described on the basis of FIGS. 11 and 12. FIG. 11 is a diagram showing vectors of driving forces generated from the focus coils 152*a*, 152*b* at the time of emitting the first laser beam and a composite vector of these vectors. FIG. 12 is a diagram showing vectors of driving forces generated from the focus coils 152a, 152b at the time of emitting the second laser beam and a composite vector of these vectors.

As described above, the first light emission part 36 for emitting the first laser beam is placed on the center axis of the optical system, so that the first laser beam does not cause the image height deviation. Thus, as shown in FIG. 11, when the first laser beam is emitted, focus driving currents i1, i2 generated on the basis of the focus error signal detected by the error signal detection section 127 are supplied to the focus coils 152a and 152b. That is, the same focus driving currents are supplied to the focus coils 152a and 152b. Then, a driving force F1 generated by the focus coil 152a and a driving force F2 generated by the focus coil 152b are forces having the same size along the focus direction, and the resultant force becomes a force F acting on a static balancing point of resilient element G (and the center of gravity) of the movable member. As a result of that, the objective lens 54b is driven in the focus direction based on the focus driving currents without an inclination of the optical axis from the focus direction. Incidentally, the static balancing point of resilient element of the movable member is not always identical with the center of gravity of the movable member. However, generally, an optical pickup apparatus, which is the object of the invention, is designed so that both are approximately identical with each other. The embodiment of the invention will be given on a case that both are identical with each other. The static balancing point of resilient element is a point where displacements of each of suspensions in a force direction due to the force applied to the plurality of suspensions are equal to each other. In general, in case of supporting the movable member with four suspensions, when sectional shapes and physical constant of the suspensions are identical with each other, the static balancing point is the centroid of a quadrangle which is constructed by four centroids of sections of the suspensions. In this embodiment, when sectional shapes and physical constant of the four linear suspension parts 116, 117, 118, 119 are identical with each other, and spacing between 116 and 117 is equal to spacing between 118 and 119, and spacing between 116 and 118 is equal to spacing between 117 and 119, the static balancing point of resilient element is the centroid of a rectangular which is constructed by four centroids of sections of the suspensions.

On the other hand, the second light emission part 40 for emitting the second laser beam is placed with deviating from the center axis of the optical system, so that the second laser beam causes the image height deviation. Hence, when the second laser beam is emitted, it is constructed so that the focus driving current generated on the basis of the focus error signal is supplied to one of the focus coils 152a and 152b, but a current in which an offset current is added to the focus driving current is supplied to the other of the focus coils 152a and 152b. For example, as shown in FIG. 12, a current in which the offset current generated by the offset generation part 126 is added to the focus driving current is supplied to the focus coil 152a, and the focus driving current is supplied to the focus coil 152b. Then, a driving force F1 generated by the focus coil 152a is larger than a driving force F2 generated by the focus coil 152b. The resultant force becomes a force F acting on a position distant from the static balancing point of resilient element G (and the center of gravity) of the movable member in the tracking direction. As a result of that, driving point of the movable member is displaced from the static balancing point of resilient element by difference between two driving forces in the focus direction generated at the two focus coils, respectively, that is, the offset value, so that the movable member is driven in the focus direction always in a inclined state.

Figure 13:
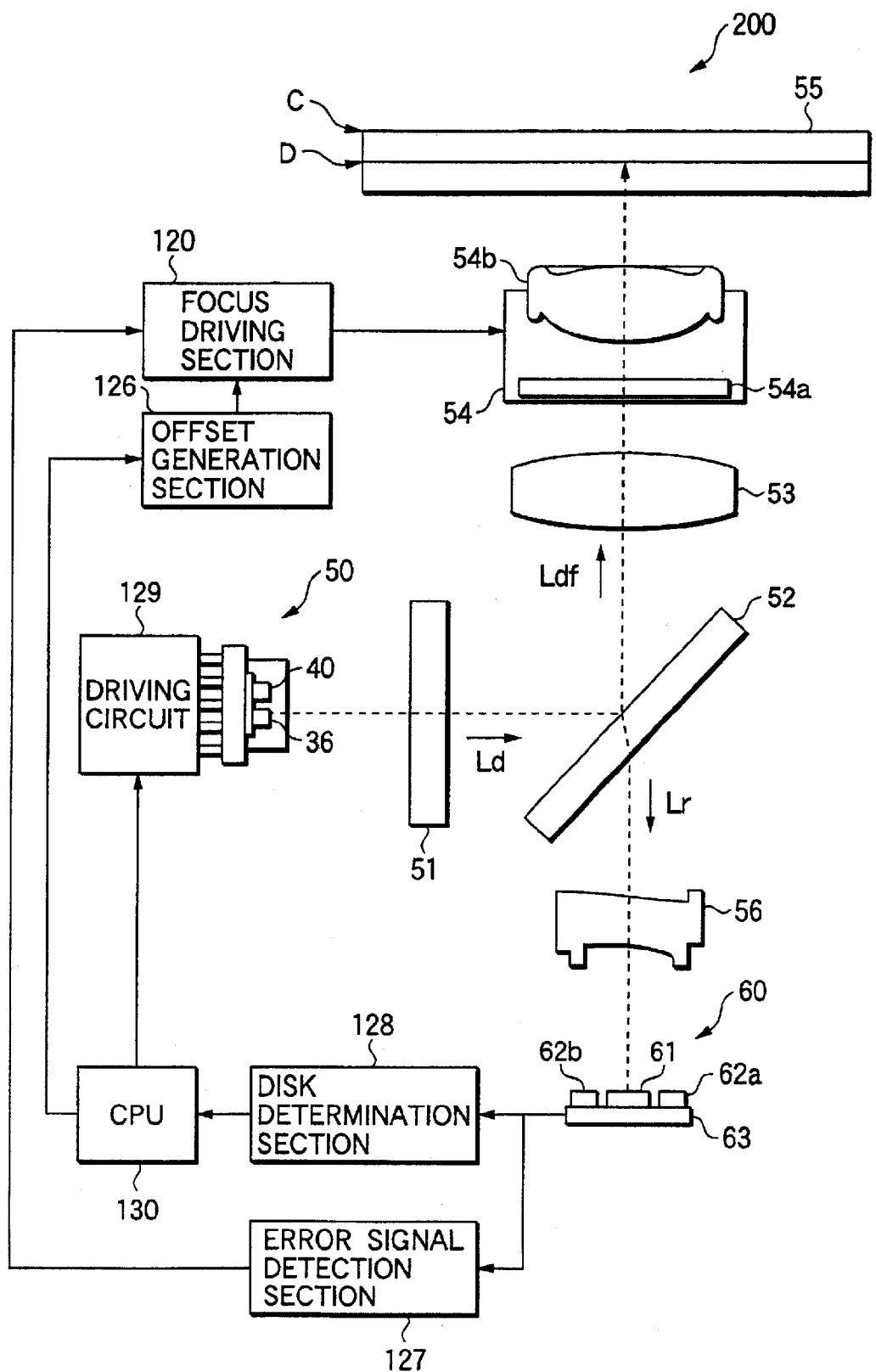
FIG. 13 is a diagram showing operations of the optical pickup apparatus according to the embodiment of the invention.
Figure 14:
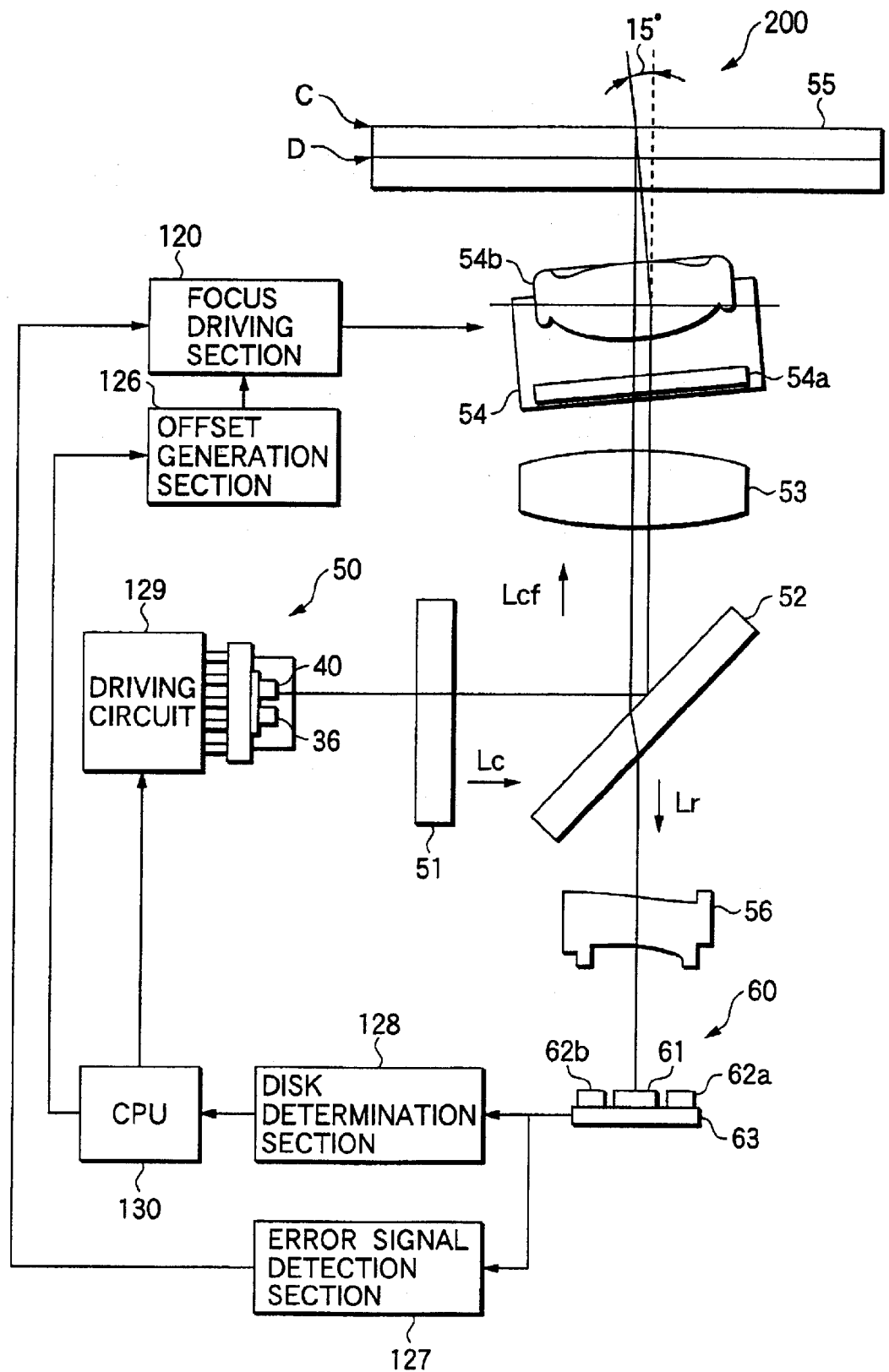
FIG. 14 is a diagram showing operations of the optical pickup apparatus according to the embodiment of the invention.

Next, the entire operations of the optical pickup apparatus 200 according to the embodiment of the invention will be described referring to FIGS. 13 and 14. FIG. 13 shows the case of reproducing the DVD, and FIG. 14 shows the case of reproducing the CD or the CDR.

As shown in FIG. 13, if it is determined that the optical disk 55 to be reproduced is the DVD by the disk identification signal from the disk determination section 128, the CPU 130 controls the driving circuit 129 to selectively drive the first light emission part 36 of the semiconductor laser element 50 and also issues a command to the effect that an offset current is not generated to the offset generation part 126. Thus, the focus driving section 120 generates the focus driving current corresponding to a size of the focus error signal supplied from the error signal detection section 127 and supplies the focus driving current to the focus coils 152a, 152b. That is, the focus driving currents having the same size are always supplied to the focus coils 152a, 152b, respectively, so that the focus driving force occurs in a position acting on the static balancing point of resilient element (and the center of gravity) of the movable member as shown in FIG. 11.

A part of the emission light Ld of the first laser beam emitted from the semiconductor laser element 50 is reflected by the half mirror 52 through the grating lens 51 and is made to a parallel flux of light by the collimator lens 53 and then is incident into the bifocal lens 54.

The first laser beam incident on the bifocal lens 54 is diffracted to zero-order light, ± first-order light and other high-order light by a diffraction element 54a, but the zero-order light is used for reproducing the DVD, so that the objective lens 54b gathers the zero-order light of the first laser beam on an information recording surface D of the optical disk 55. Then, the return light Lr of the first laser beam reflected by the information recording surface D of the DVD passes through the bifocal lens 54 and the collimator lens 53 and a part of the return light is transmitted by the half mirror 52 and passes through the cylindrical lens 56 and a main beam is incident on the first detection part 61 of the photodetector 60 and sub-beams is incident on the two sub-detection parts 62a, 62b. Then, a detection signal from the first detection part 61 is used as the focus error FE signal and a detection signal from the sub-detection parts 62a, 62b is used as the tracking error TE signal and these signals are supplied to the error signal detection section 127.

On the other hand, as shown in FIG. 14, if it is determined that the optical disk 55 to be reproduced is the CD or the CDR by the disk identification signal from the disk determination section 128, the CPU 130 controls the driving circuit 129 to selectively drive the second light emission part 40 of the semiconductor laser element 50 and also issues a command to the effect that a predetermined offset current is generated to the offset generation section 126. The offset generation section 126 supplies a predetermined offset value previously stored in ROM (not shown) based on a control signal from the CPU 130, namely an offset value of "1.732" being necessary to incline an optical axis of the objective lens 54b, for example, by left 15° to the focus driving part 120.

Thus, the focus driving section 120 generates a first focus driving current corresponding to a size of the focus error signal supplied from the error signal detection part 127 and further generates a second focus driving current in which the offset current generated in the offset generation section 126 is added to the first focus driving current. Then, while the first focus driving current is supplied to one of the focus coils 152a, 152b, the second focus driving current is supplied to the other. As a result of that, the focus driving current having the different size is always supplied to the focus coils 152a, 152b, so that the focus driving force acts on the position different from that of the static balancing point of resilient element (and the center of gravity) of the movable member as shown in FIG. 12 and the objective lens can be driven in the focus direction with the objective lens inclined by the turning moment as described above.

A part of the emission light Lc of the second laser beam emitted from the semiconductor laser element 50 is reflected by the half mirror 52 through the grating lens 51 and is made to a parallel flux of light by the collimator lens 53 and then is incident into the bifocal lens 54.

The first laser beam incident on the bifocal lens 54 is diffracted to zero-order light, first-order light and other high-order light by the diffraction element 54a, but any one of ± first-order light is used for reproduction of the CD, so that the objective lens 54b gathers any one of the first-order light of the incident light Lc of the second laser beam diffracted by the diffraction element 54a on an information recording surface C of the optical disk 55. At this time, a predetermined offset is applied to the objective lens 54b by the focus driving section 120 and the objective lens 54b is controlled with the objective lens inclined in the focus direction, so that a beam spot of the second laser beam passing through the objective lens 54b is formed on a pit of the information recording surface C in a suitable aberration state.

Then, the return light Lr of the second laser beam reflected by the information recording surface C of the CD passes through the bifocal lens 54 and the collimator lens 53 and a part of the return light is transmitted by the half mirror 52 and passes through the cylindrical lens 56 and is incident on the first detection part 61 of the photodetector 60. Then, a detection signal from the first detection part 61 is used as the focus error FE signal and a detection signal from the sub-detection parts 62a, 62b is used as the tracking error TE signal and these signals are supplied to the error signal detection section 127.

As described above, in the optical pickup apparatus 200 according to the embodiment of the invention, when a disk determination result by the disk determination section 128 is the CD or the CDR, it is constructed so that the offset current is generated from the offset generation section 126, and the focus driving section 120 generates the first focus driving current corresponding to the size of the focus error signal supplied from the error signal detection section 127 and further generates the second focus driving current in which the offset current generated in the offset generation section 126 is added to the first focus driving current and the first focus driving current is supplied to one of the focus coils 152a, 152b and also the second focus driving current is supplied to the other.

Therefore, the image height deviation of the second light emission part 40 at the time of reproducing the CD can be compensated by inclining the objective lens, so that a coma aberration can be suppressed to reproduce the CD or the CDR well in a manner similar to the DVD reproduction by the first light emission part 36 with no image height deviation.

Figure 15:
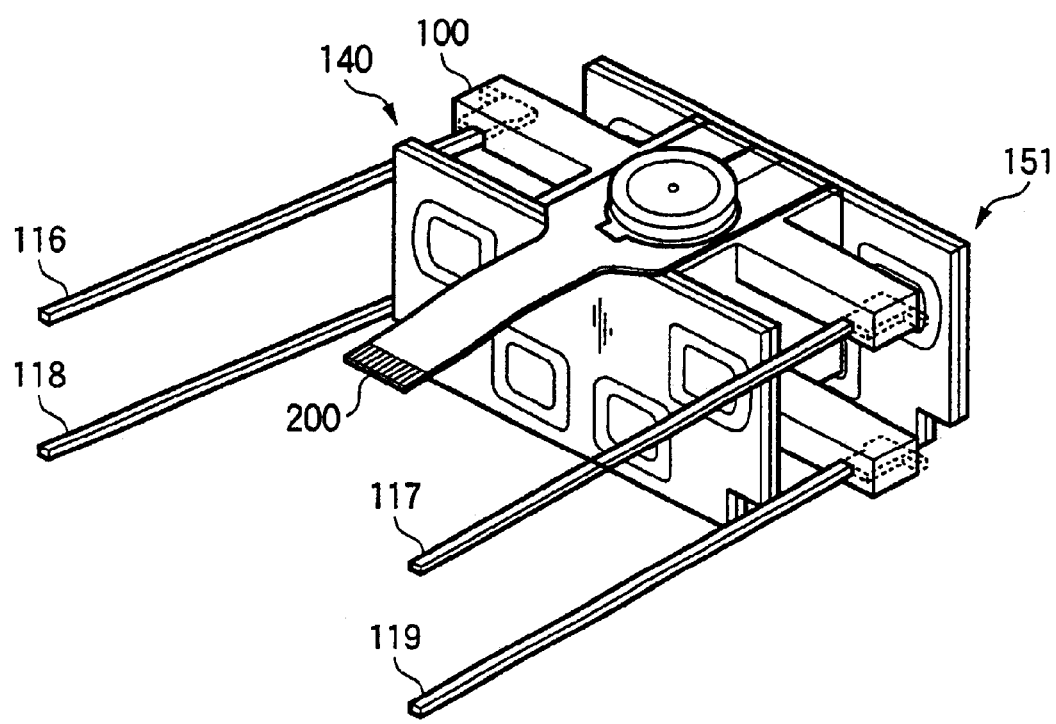
FIG. 15 is a perspective view showing another embodiment of the invention.
Figure 16:
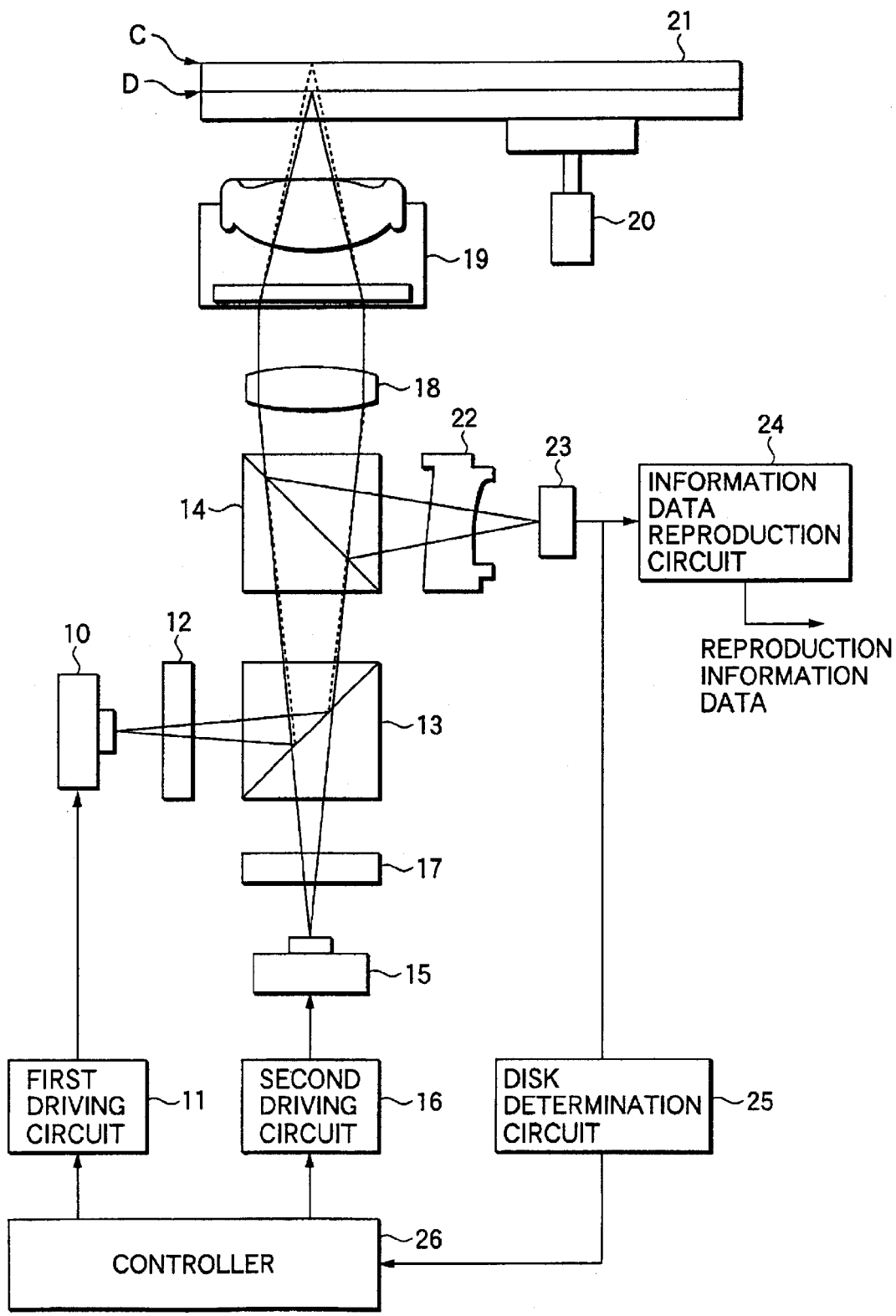
FIG. 16 is a block diagram of an optical pickup apparatus according to a related art.

Next, another embodiment of the invention will be described on the basis of FIG. 15. As shown in FIG. 15, in the embodiment, it is constructed so that a Flexible Print Circuit 200 for feeding is bridged between the movable member and the suspension base (not shown) and thereby any of feeding of the driving current to the focus coil 152a, 152b or the tracking coils 151a, 151b is provided. Thus, four linear suspension members 116 to 119 do not need to be formed in an insulated multi-layer structure and can be constructed as a simple metal line. For example, it can be constructed so that the suspension members 116 and 118 take charge of an input line and an output line of the driving current to the focus coil 152a and the suspension members 117 and 119 take charge of an input line and an output line of the driving current to the focus coil 152b and the Flexible Print Circuit 200 for feeding takes charge of an input line and an output line of the driving current to the pair of the tracking coils 151a, 151b.

Incidentally, in the optical pickup apparatus 200 according to the embodiment of the invention, it is constructed so that the first light emission part 36 for emitting the first laser beam for reproducing the DVD is placed on the center axis of the optical system and the second light emission part 40 for emitting the second laser beam for reproducing the CD is placed in the position distant from the center axis of the optical system and the offset is generated only at the time of reproducing the CD. However, the invention is not limited to this, and it may be constructed so that the second light emission part 40 is placed on the center axis of the optical system and an offset is generated at the time of reproducing the DVD. Also, it may be constructed so that the first light emission part 36 and the second light emission part 40 are placed in a position distant from the center axis of the optical system by approximately the same distance and an offset is generated at the time of reproducing both the DVD and the CD. In this case, it is necessary to set an offset current at the time of reproducing the DVD different from an offset current at the time of reproducing the CD.

Also, the optical pickup apparatus 200 according to the embodiment is constructed by an infinite optical system with divergent light made to parallel light using the collimator lens 53, but is not limited to this optical system and may be constructed by a finite optical system. In case that the optical pickup is designed so that the static balancing point of resilient element of the movable member is different from the center gravity of the movable member, it is preferable that the static balancing point of resilient element of the movable member is identical with the focus driving point when there is not the offset value.

According to the invention, while the number of parts of an optical system can be reduced (for example, the need for a prism is eliminated), the optical system can be placed integrally, and cost reduction and space saving can be achieved. Also, an error of a focus error signal occurring due to a coma aberration can be decreased to perform a proper focus servo adjustment.

What is claimed is:

1. An optical pickup apparatus enabling to read information of a plurality of recording mediums having different reading wavelengths from each other, the optical pickup apparatus comprising:

a light emission unit including a first light emission source adapted to emit a first laser beam, and a second light emission source disposed adjacent to the first light emission source and adapted to emit a second laser beam whose wavelength is different from that of the first laser beam;

an objective lens fixed to a movable member, the objective lens for focusing the first and second laser beam;

a focus driving unit for driving the objective lens in at least one direction;

a photodetection unit; and an optical system for guiding the first and second laser beams emitted from the light emission unit to the recording medium, the optical system for guiding a reflected light beam reflected by the recording medium to the photodetection unit, wherein the focus driving unit comprises a plurality of focus driving units;

the focus driving units are symmetrically placed with respect to the static balancing point of a support part for supporting the movable member;

each of the focus driving units has at least one pair of driving coils to which focus driving currents are supplied to generate a driving force in a focus direction;

the focus driving currents different from each other are supplied to the force driving units, respectively, to drive the objective lens in the focus direction with an inclination in relation to the focus direction.

2. The optical pickup apparatus according to claim 1, wherein any one of the first and second light emission sources is selectively driven to emit a laser beam.

3. The optical pickup apparatus according to claim 1, wherein the focus direction, in which the objective lens is driven, is a direction for focusing the first and second light beams at a predetermined position on the recording medium.

4. The optical pickup apparatus according to claim 1, wherein the optical system including:

a grating for generating a pair of sub-beams from the first and second laser beams;

a half mirror for guiding the first and second laser beams to the recording medium while guiding a reflected light beam reflected by the record medium to the photodetection unit;

a collimator lens for converting the first and second laser beams into a parallel light beam; and a cylindrical lens.

5. The optical pickup apparatus according to claim 1, wherein one of the first and second light emission sources is placed in a position which has an image height with respect to the objective lens;

the other of the first and second light emission sources is placed in a position which has not the image height;

when one of the first and second light emission sources is driven, the focus driving currents different from each other are supplied to the pair of the focus driving coils, respectively, when the other of the first and second light emission sources is driven, the focus driving currents, which are equal to each other, are supplied to the pair of the focus driving coils, respectively.

6. The optical pickup apparatus according to claim 1, further comprising an offset addition unit for adding an offset current to the focus driving current, wherein when one of the first and second light emission sources is driven, the focus driving current and the sum of the focus driving current and the offset current added by the offset addition unit are supplied to the pair of the focus driving coils, respectively.

7. The optical pickup apparatus according to claim 1, wherein the focus driving current is generated based on a focus error signal.

* * * * *